US011064399B2

(12) United States Patent
Shi et al.

(10) Patent No.: US 11,064,399 B2
(45) Date of Patent: Jul. 13, 2021

(54) DATA TRANSMISSION METHOD AND APPARATUS FOR ESTABLISHING A RADIO BEARER ON MULTIPLE CELLS

(71) Applicant: ZTE CORPORATION, Guangdong (CN)

(72) Inventors: Xiaojuan Shi, Shenzhen (CN); He Huang, Shenzhen (CN)

(73) Assignee: ZTE Corporation, Guangdong (CN)

( * ) Notice: Subject to any disclaimer, the term of this patent is extended or adjusted under 35 U.S.C. 154(b) by 196 days.

(21) Appl. No.: 16/480,666

(22) PCT Filed: Dec. 29, 2017

(86) PCT No.: PCT/CN2017/119865
§ 371 (c)(1),
(2) Date: Jul. 24, 2019

(87) PCT Pub. No.: WO2018/137468
PCT Pub. Date: Aug. 2, 2018

(65) Prior Publication Data
US 2021/0136637 A1 May 6, 2021

(30) Foreign Application Priority Data
Jan. 24, 2017 (CN) .......................... 201710064143.2

(51) Int. Cl.
H04W 36/00 (2009.01)
H04W 12/108 (2021.01)
H04W 36/18 (2009.01)

(52) U.S. Cl.
CPC ..... *H04W 36/0038* (2013.01); *H04W 12/108* (2021.01); *H04W 36/18* (2013.01)

(58) Field of Classification Search
CPC ......... H04W 12/0013; H04W 12/0017; H04W 12/1006; H04W 36/00; H04W 36/18;
(Continued)

(56) References Cited

U.S. PATENT DOCUMENTS 13,437,306    5/2013  Attar et al.
2009/0103445 A1  4/2009  Sammour et al.
(Continued)

FOREIGN PATENT DOCUMENTS

CN    101779489 A    7/2010
CN    101997660 A    3/2011
(Continued)

OTHER PUBLICATIONS

International Search Report of corresponding PCT Application No. PCT/CN2017/119865—4 pages (dated Apr. 4, 2018).
(Continued)

*Primary Examiner* — Mewale A Ambaye
(74) *Attorney, Agent, or Firm* — Knobbe Martens Olson & Bear LLP

(57) ABSTRACT

Provided are data transmission method and apparatus. The method can includes: establishing an RB on a second cell, receiving, by the first PDCP entity, a packet data convergence protocol service data unit (PDCP SDU) from a core network or a protocol layer above the PDCP entity, and allocating a hyper frame number (HFN) and a sequence number (SN) for the PDCP SDU; processing, by the first PDCP entity, the PDCP SDU according to the 10 SN and HFN to generate a first packet data convergence protocol packet data unit (PDCP PDU); transmitting, by the first PDCP entity, the PDCP SDU as well as the SN and HFN allocated for the PDCP SDU to the second PDCP entity; and processing, by the second PDCP entity, the PDCP SDU according to the SN and HFN transmitted by the first PDCP entity to generate a second PDCP PDU.

14 Claims, 7 Drawing Sheets

(58) Field of Classification Search
CPC ......... H04W 36/0016; H04W 36/0033; H04W 36/0038; H04W 12/108; H04W 36/14; H04W 36/24; H04W 12/06; H04W 12/10; H04L 12/10; H04L 1/18; H04L 12/02; H04L 29/0655; H04L 43/00
See application file for complete search history.

(56) References Cited

U.S. PATENT DOCUMENTS

| | | | |
|---|---|---|---|
| 2009/0124259 A1* | 5/2009 | Attar | H04L 47/34 455/436 |
| 2016/0021581 A1 | 1/2016 | Deenoo et al. | |
| 2020/0100142 A1* | 3/2020 | Kim | H04W 76/27 |
| 2020/0169887 A1* | 5/2020 | Wager | H04W 12/121 |
| 2020/0169916 A1* | 5/2020 | Gholmieh | H04W 12/106 |

FOREIGN PATENT DOCUMENTS

| | | |
|---|---|---|
| CN | 102158899 A | 8/2011 |
| WO | 2009/021214 A2 | 2/2009 |
| WO | 2009/046041 A2 | 4/2009 |
| WO | 2014/113686 A2 | 7/2014 |

OTHER PUBLICATIONS

Extended European Search Report of corresponding European Patent Application No. 17893891.6—10 pages (dated Jul. 21, 2020).
LTE, "Evolved Universal Terrestrial Radio Access (E-UTRA); Packet Data Convergence Protocol (PDCP) specification (3GPP TS 36.323 version 13.3.1 Release 13", ETSI TS 136 323 V13.3.1—41 pages (Nov. 7, 2016).

* cited by examiner

DATA TRANSMISSION METHOD AND APPARATUS FOR ESTABLISHING A RADIO BEARER ON MULTIPLE CELLS

CROSS-REFERENCES TO RELATED APPLICATIONS

This application is a U.S. National Stage Application, filed under 35 U.S.C. 371, of International Patent Application No. PCT/CN2017/119865, filed on Dec. 29, 2017, which claims priority to a Chinese patent application No. 201710064143.2 filed on Jan. 24, 2017, the disclosure of which are incorporated herein by reference in their entireties.

TECHNICAL FIELD

The present disclosure relates to the field of wireless communications and, in particular, to a data transmission method and a data transmission apparatus.

BACKGROUND

The cellular mobile communication technology has entered a 4th generation (4G) era after a few decades of development, in order to meet higher, faster and newer communication requirements in the foreseeable future, the industry has begun to carry out researches on the future 5th generation (5G) technology. At present, industry generally recognized 5G technology goals are to achieve a 1000 times growth of mobile data traffic per region by 2020, a 10 to 100 times growth of throughput per user equipment (UE), a 10 to 100 times growth of the number of connection devices, and a 10 times extension of the battery life for low-power devices and a 5 times reduction of the end-to-end delay.

Two most significant technical goals among the 5G technical goals are to implement the increase of one or two orders of magnitude for the throughput and user peak rate. The industry has found that the 5G technology goals cannot be achieved simply by enhancing or upgrading the existing network. Therefore, it is necessary to further accelerate the exploration of new network deployment strategies and new technologies on the basis of the further evolution of the existing network and existing technologies.

In terms of the network deployment strategies, deploying the network densely and using a high-frequency band with a larger bandwidth (such as 500 MHz-1 GHz), such as a band above 6 GHz, are considered by the industry as two promising means for the future network development. The dense network deployment refers to densely deploying low power nodes (LPNs) in indoor and/or outdoor hotspot areas to provide small cell coverage. Conceptually speaking, the LPN refers to a base station node with a transmission power lower than that of the traditional macro base station, and a coverage range smaller than that of the traditional macro base station (such as several tens of meters). The LPN may be a Pico Node, a Femto/Home (e)NB, a radio Relay access device, and any other base station nodes or network access nodes in the radio network that may occur and satisfy the above concepts. The dense network deployment may effectively overcome the problem that the traditional cellular radio network is unable to satisfy a new feature of most communication services in the future 5G communication concentrated in indoor and/or outdoor hotspot areas due to its characteristic of the wide, even and fixed coverage. The use of the high-frequency band (such as a millimeter wave band) may overcome the stretched current situation of the low-frequency band, providing a sufficient bandwidth for the future 5G communication system.

On one hand, the dense deployment of the network and the reduction of the small cell coverage radius enable the UE to move frequently in different cells even at a low rate; on the other hand, due to characteristics of high-frequency carrier such as high path loss, high air absorption (oxygen absorption, rain attenuation, fog attenuation), low penetration, and shadow attenuation sensitivity, the coverage area of the high frequency carrier is much smaller than that of the related communication system (such as a LTE system) using the low frequency carrier, to overcome this problem, the industry adopts the beamforming to provide higher antenna gains for improving the coverage area of the high frequency carrier. However, after adopting the beamforming, the UE communicates with the cell through a beam with a strong direction. Once the transmitting and receiving beams are not aligned, or the beam is blocked by the object, the transmission link between the UE and the cell will be interrupted. In the existing art, in a connection state, when the UE moves among different cells or the current transmission link of the UE goes wrong, the UE may switch from one cell to another cell through handover to ensure the service continuity. However, the handover method in the existing art has more or less caused a short interruption of the data transmission during the handover process. In the 5G, due to the dense deployment of the network and the use of the high-frequency frequency band, the frequency for the UE replacing the cell is many times higher than that in the existing network, If the relevant handover technology is used for implementing this process, the interruption of the data transmission will occur frequently and the throughput and user experience will be influenced.

SUMMARY

To solve the above technical problem, an embodiment of the present disclosure provides a data transmission method and a data transmission apparatus.

The data transmission method provided by an embodiment of the present disclosure includes:
  after establishing a radio bearer (RB) on a first cell, establishing an RB on a second cell, wherein a packet data convergence protocol (PDCP) entity of the RB on the first cell is a first PDCP entity of the RB, a PDCP entity of the RB on the second cell is a second PDCP entity of the RB;
  before deleting the RB on the first cell, receiving, by the first PDCP entity, a packet data convergence protocol service data unit (PDCP SDU) from a core network or a protocol layer above the PDCP entity, and allocating, by the first PDCP entity, a hyper frame number (HFN) and a sequence number (SN) for the PDCP SDU;
  processing, by the first PDCP entity, the PDCP SDU according to the SN and the HFN to generate a first packet data convergence protocol packet data unit (PDCP PDU);
  transmitting, by the first PDCP entity, the PDCP SDU as well as the SN and the HFN allocated for the PDCP SDU to the second PDCP entity; and
  processing, by the second PDCP entity, the PDCP SDU according to the SN and the HFN transmitted by the first PDCP entity, to generate a second PDCP PDU.

In an embodiment of the present disclosure, establishing the RB on the second cell includes:
  establishing the PDCP entity, a radio link control (RLC) entity and a logical channel on the second cell.

In an embodiment of the present disclosure, processing, by the first PDCP entity, the PDCP SDU according to the SN and the HFN to generate the first PDCP PDU includes:

if the first PDCP PDU needs to be processed by ciphering, performing the ciphering on the PDCP PDU according to the SN and the HFN; if the first PDCP PDU needs to be processed by integrity protection, performing the integrity protection on the PDCP PDU according to the SN and the HFN; if the first PDCP PDU needs to be processed by the ciphering and the integrity protection, performing the ciphering and the integrity protection on the PDCP PDU according to the SN and the HFN; and generating a packet header of the first PDCP PDU according to the SN;

where the first PDCP entity ciphers the PDCP PDU with an ciphering and deciphering security key of the first PDCP entity; and the first PDCP entity uses an integrity protection key of the first PDCP entity to perform the integrity protection on the PDCP PDU.

In an embodiment of the present disclosure, processing, by the second PDCP entity, the PDCP SDU according to the SN and the HFN transmitted by the first PDCP entity to generate the second PDCP PDU includes:

if the PDCP PDU needs to be processed by ciphering, performing the ciphering on the PDCP PDU according to the SN and the HFN; if the PDCP PDU needs to be processed by integrity protection, performing the integrity protection on the PDCP PDU according to the SN and the HFN; if the PDCP PDU needs to be processed by the ciphering and the integrity protection, performing the ciphering and the integrity protection on the PDCP PDU according to the SN and the HFN; and generating a packet header of the second PDCP PDU according to the SN;

where the second PDCP entity ciphers the PDCP PDU with an ciphering and deciphering security key of the second PDCP entity; and the second PDCP entity uses an integrity protection key of the second PDCP entity to perform the integrity protection on the PDCP PDU.

In an embodiment of the present disclosure, if the first PDCP entity is located at a first device, the second PDCP entity is located at a second device and the first device and the second device are connected to each other through an X interface, then the first PDCP entity transmits the PDCP SDU as well as the SN and the HFN allocated for the PDCP SDU to the second PDCP entity through the X interface.

In an embodiment of the present disclosure, the method includes:

deleting the RB on the first cell;

transmitting each PDCP SDU not allocated with the SN in the first PDCP entity to the second PDCP entity.

A data transmission method provided by an embodiment of the present disclosure includes:

after establishing a radio bearer (RB) on a first cell, establishing an RB on a second cell, where a packet data convergence protocol (PDCP) entity of the RB on the first cell is a first PDCP entity of the RB, a PDCP entity of the RB on the second cell is a second PDCP entity of the RB;

processing, by the second PDCP entity, a received packet data convergence protocol packet data unit (PDCP PDU), transmitting a second packet data convergence protocol service data unit (PDCP SDU) obtained by processing the PDCP PDU and a sequence number (SN) corresponding to the second PDCP SDU to the first PDCP entity;

processing, by the first PDCP entity, a received PDCP PDU to obtain a first PDCP SDU; and before deleting the RB on the first cell, delivering, by the first PDCP entity, the first PDCP SDU and the second PDCP SDU to a protocol layer above the PDCP entity or to a core network. In an embodiment of the present disclosure, establishing the RB on the second cell includes: establishing the PDCP entity, a radio link control (RLC) entity and a logical channel on the second cell.

In an embodiment of the present disclosure, processing, by the second PDCP entity, the received PDCP PDU includes:

acquiring the SN from a packet header of the PDCP PDU;

if the PDCP PDU needs to be processed by deciphering, performing the deciphering on the PDCP PDU; if the PDCP PDU needs to be processed by integrity verification, performing the integrity verification on the PDCP PDU; if the PDCP PDU needs to be processed by the deciphering and the integrity verification, performing the deciphering and the integrity verification on the PDCP PDU;

where the second PDCP entity deciphers the PDCP PDU with an ciphering and deciphering security key of the second PDCP entity; and the second PDCP entity uses an integrity protection key of the second PDCP entity to perform the integrity verification on the PDCP PDU.

In an embodiment of the present disclosure, processing, by the first PDCP entity, the received PDCP PDU includes:

acquiring an SN from a packet header of the PDCP PDU;

if the PDCP PDU needs to be processed by deciphering, performing the deciphering on the PDCP PDU; if the PDCP PDU needs to be processed by integrity verification, performing the integrity verification on the PDCP PDU; if the PDCP PDU needs to be processed by the deciphering and the integrity verification, performing the deciphering and the integrity verification on the PDCP PDU;

where the first PDCP entity deciphers the PDCP PDU with an ciphering and deciphering security key of the first PDCP entity; and the first PDCP entity uses an integrity protection key of the first PDCP entity to perform the integrity verification on the PDCP PDU.

In an embodiment of the present disclosure, if the first PDCP entity is located at a first device, the second PDCP entity is located at a second device and the first device and the second device are connected to each other through an X interface, then the second PDCP entity transmits the second PDCP SDU obtained by the processing as well as the SN corresponding to the second PDCP SDU to the first PDCP entity through the X interface.

In an embodiment of the present disclosure, before delivering, by the first PDCP entity, the first PDCP SDU to the protocol layer above the PDCP entity or the core network, the method further includes:

performing, by the first PDCP entity, a duplicate packet detection and reordering on the second PDCP SDU transmitted by the second PDCP entity and the first PDCP SDU obtained by the processing of the first PDCP entity.

In an embodiment of the present disclosure, the method includes:

deleting the RB on the first cell;

transmitting each first PDCP SDU undelivered to the protocol layer above the PDCP entity or to the core network in the first PDCP entity and an SN corresponding to the each first PDCP SDU to the second PDCP entity, and transmitting each second PDCP SDU undelivered to the protocol layer above the PDCP entity or to the core network in the first PDCP entity and an SN corresponding to the each second PDCP SDU to the second PDCP entity.

A data transmission apparatus provided in an embodiment of the present disclosure includes:
  an establishment unit, which is configured to, after establishing a radio bearer (RB) on a first cell, establish an RB on a second cell, wherein a packet data convergence protocol (PDCP) entity of the RB on the first cell is a first PDCP entity of the RB, a PDCP entity of the RB on the second cell is a second PDCP entity of the RB;
  a reception unit, which is configured, before deleting the RB on the first cell, enable the first PDCP entity to receive a packet data convergence protocol service data unit (PDCP SDU) from a protocol layer above the PDCP entity or from a core network;
  an allocation unit, which is configured to allocate a sequence number (SN) and a hyper frame number (HFN) for the PDCP SDU;
  a transmission unit, which is configured to enable the first PDCP entity to transmit the PDCP SDU as well as the SN and the HFN allocated for the PDCP SDU to the second PDCP entity;
  a first processing unit, which is configured to enable the first PDCP entity to process the PDCP SDU according to the SN and the HFN to generate a first packet data convergence protocol packet data unit (PDCP PDU);
  a second processing unit, which is configured to enable the second PDCP entity to process the PDCP SDU according to the SN and the HFN transmitted by the first PDCP entity to generate a second PDCP PDU.

In an embodiment of the present disclosure, the establishment unit is further configured to establish the PDCP entity, an RLC entity and a logical channel on the second cell.

In an embodiment of the present disclosure, the first processing unit is further configured to if the PDCP PDU needs to be processed by ciphering, perform the ciphering on the PDCP PDU according to the SN and the HFN; if the PDCP PDU needs to be processed by integrity protection, perform the integrity protection on the PDCP PDU according to the SN and the HFN; if the PDCP PDU needs to be processed by the ciphering and the integrity protection, perform the ciphering and the integrity protection on the PDCP PDU according to the SN and the HFN; and generate a packet header of the first PDCP PDU according to the SN; where the first PDCP entity ciphers the PDCP PDU with an ciphering and deciphering security key of the first PDCP entity; and the first PDCP entity uses an integrity protection key of the first PDCP entity to perform the integrity protection on the PDCP PDU.

In an embodiment of the present disclosure, the second processing unit is further configured to if the PDCP PDU needs to be processed by ciphering, perform the ciphering on the PDCP PDU according to the SN and the HFN; if the PDCP PDU needs to be processed by integrity protection, perform the integrity protection on the PDCP PDU according to the SN and the HFN; if the PDCP PDU needs to be processed by the ciphering and the integrity protection, perform the ciphering and the integrity protection on the PDCP PDU according to the SN and the HFN; and generate a packet header of the second PDCP PDU according to the SN; where the second PDCP entity ciphers the PDCP PDU with an ciphering and deciphering security key of the second PDCP entity; and the second PDCP entity uses an integrity protection key of the second PDCP entity to perform the integrity protection on the PDCP PDU.

In an embodiment of the present disclosure, if the first PDCP entity is located at a first device, the second PDCP entity is located at a second device and the first device and the second device are connected to each other through an X interface, then the transmission unit is specifically used for transmitting the PDCP SDU as well as the SN and the HFN allocated for the PDCP SDU to the second PDCP entity through the X interface.

In an embodiment of the present disclosure, the apparatus further includes:
  a deletion unit, which is configured to delete the RB on the first cell; and
  the transmission unit is further configured to transmit each PDCP SDU not allocated with the SN in the first PDCP entity to the second PDCP entity.

A data transmission apparatus provided in an embodiment of the present disclosure includes:
  an establishment unit, which is configured to, after establishing a radio bearer (RB) on a first cell, establish an RB on a second cell, wherein a packet data convergence protocol (PDCP) entity of the RB on the first cell is a first PDCP entity of the RB, a PDCP entity of the RB on the second cell is a second PDCP entity of the RB;
  a first processing unit, which is configured to enable the second PDCP entity to process a received PDCP PDU, transmit a second PDCP SDU obtained by processing the PDCP PDU and a sequence number (SN) corresponding to the second PDCP SDU to the first PDCP entity;
  a second processing unit, which is configured to enable the first PDCP entity to process a received PDCP PDU to obtain a first PDCP SDU; and
  a transmission unit, which is configured to, before deleting the RB on the first cell, enable the first PDCP entity to deliver the first PDCP SDU and the second PDCP SDU to a protocol layer above the PDCP entity or to a core network.

In an embodiment of the present disclosure, the establishment unit is further configured to establish the PDCP entity, a RLC entity and a logical channel on the second cell.

In an embodiment of the present disclosure, the first processing unit is further configured to acquire the SN from a packet header of the PDCP PDU; if the PDCP PDU needs to be processed by deciphering, perform the deciphering on the PDCP PDU; if the PDCP PDU needs to be processed by integrity verification, perform the integrity verification on the PDCP PDU; if the PDCP PDU needs to be processed by the deciphering and the integrity verification, perform the deciphering and the integrity verification on the PDCP PDU; where the second PDCP entity deciphers the PDCP PDU with an ciphering and deciphering security key of the second PDCP entity; and the second PDCP entity uses an integrity protection key of the second PDCP entity to perform the integrity verification on the PDCP PDU.

In an embodiment of the present disclosure, the second processing unit is further configured to acquire an SN from a packet header of the PDCP PDU; if the PDCP PDU needs to be processed by deciphering, perform the deciphering on the PDCP PDU; if the PDCP PDU needs to be processed by integrity verification, perform the integrity verification on the PDCP PDU; if the PDCP PDU needs to be processed by the deciphering and the integrity verification, perform the deciphering and the integrity verification on the PDCP PDU;

where the first PDCP entity deciphers the PDCP PDU with an ciphering and deciphering security key of the first PDCP entity; and the first PDCP entity uses an integrity protection key of the first PDCP entity to perform the integrity verification on the PDCP PDU.

In an embodiment of the present disclosure, if the first PDCP entity is located at a first device, the second PDCP entity is located at a second device and the first device and the second device are connected to each other through an X interface, then the first processing unit transmits the second PDCP SDU obtained by processing the PDCP PDU as well as the SN corresponding to the second PDCP SDU to the first PDCP entity through the X interface.

In an embodiment of the present disclosure, the apparatus further includes:
- a detection and reordering unit, which is configured to enable the first PDCP entity to perform a duplicate packet detection and reordering on the second PDCP SDU transmitted by the second PDCP entity and the first PDCP SDU obtained by the processing of the first PDCP entity.

In an embodiment of the present disclosure, the apparatus further includes:
- a deletion unit, which is configured to delete the RB on the first cell; and
- a transmission unit, which is configured to transmit each first PDCP SDU undelivered to the protocol layer above the PDCP entity or to the core network in the first PDCP entity and an SN corresponding to the each first PDCP SDU to the second PDCP entity, and transmit each second PDCP SDU undelivered to the protocol layer above the PDCP entity or to the core network in the first PDCP entity and an SN corresponding to the each second PDCP SDU to the second PDCP entity.

An embodiment of the present disclosure provides a computer-readable storage medium configured to store a computer-executable program. The computer-executable program includes executable instructions which, when executed by a processor, implement the above-mentioned data transmission method.

In solutions of the embodiments of the present disclosure, a data transmission method at a transmitting end includes: after establishing a radio bearer (RB) on a first cell, establishing an RB on a second cell, where a packet data convergence protocol (PDCP) entity of the RB on the first cell is a first PDCP entity of the RB, a PDCP entity of the RB on the second cell is a second PDCP entity of the RB; before deleting the RB on the first cell, receiving, by the first PDCP entity, a packet data convergence protocol service data unit (PDCP SDU) from a core network or a protocol layer on the PDCP entity, and allocating a hyper frame number (HFN) and a sequence number (SN) for the PDCP SDU; processing, by the first PDCP entity, the PDCP SDU according to the SN and HFN to generate a first packet data convergence protocol packet data unit (PDCP PDU); transmitting, by the first PDCP entity, the PDCP SDU as well as the SN and HFN allocated for the PDCP SDU to the second PDCP entity; and processing, by the second PDCP entity, the PDCP SDU according to the SN and HFN transmitted by the first PDCP entity to generate a second PDCP PDU. A data transmission method at a receiving end includes: after establishing a radio bearer (RB) on a first cell, establishing an RB on a second cell, where a PDCP entity of the RB on the first cell is a first PDCP entity of the RB, a PDCP entity of the RB on the second cell is a second PDCP entity of the RB; processing, by the second PDCP entity, a received PDCP PDU, transmitting a second PDCP SDU obtained by the processing and a SN corresponding to the second PDCP SDU to the first PDCP entity; processing, by the first PDCP entity, a received PDCP PDU to obtain a first PDCP SDU; before deleting the RB on the first cell, delivering, by the first PDCP entity, the first PDCP SDU and the second PDCP SDU to a protocol layer above the PDCP entity or a core network. The solutions of the embodiments of the present disclosure are able to implement the zero-interrupt data transmission in a process where UE frequently switches between cells in 5G, ensuring the throughput and user experience in the process of frequent cell switching.

This section provides a summary of various embodiments and examples of the techniques described in the present disclosure, but those are not the whole scope of the disclosed techniques or full disclosure of all features.

BRIEF DESCRIPTION OF DRAWINGS

The drawings generally illustrate various embodiments discussed in the present disclosure by way of example and not by way of limitation.

DETAILED DESCRIPTION

To provide a more detailed understanding of features and technical content of embodiments of the present disclosure, implementation of the embodiments of the present disclosure is described below in detail in conjunction with the drawings. The drawings are provided for reference only and are not intended to limit the embodiments of the present disclosure.

The Chinese-English paraphrases of the technical terms involved in the embodiments of the present disclosure are as follows:

| Abbreviation | English full name | Chinese paraphrase |
| --- | --- | --- |
| RB | Radio Bearer | 无线承载 |
| SN | Sequence Number | 序列号 |
| HFN | Hyper Frame Number | 超帧号 |
| MAC | Medium Access Control | 媒体接入控制 |
| RLC | Radio Link Control | 无线链路控制 |
| PDCP | Packet Data Convergence Protocol | 分组数据汇聚协议 |
| SDU | Service Data Unit | 服务数据单元 |
| PDU | Packet Data Unit | 分组数据单元 |
| IP | Internet Protocol | 互联网协议 |
| TCP | Transmission Control Protocol | 传输控制协议 |
| UDP | User Datagram Protocol | 用户数据报协议 |

Solutions of the embodiments of the present disclosure are applied to, but not limited to, a 5G scenario. In a 5G scenario, functions of main function entities are described below.

User equipment (UE) accesses a 5G network mainly via a wireless air interface and obtains services. A terminal exchanges information with a base station via an air interface, and exchanges information with a function module or a function entity for mobility management in a core network via a Non-Access-Stratum (NAS) signaling.

The base station is responsible for resource scheduling and connection management for the air interface through which the terminal access the network.

An Access and Mobility Management Function (AMF) is mainly responsible for access authentication, authorization and mobility management.

A Session Management Function (SMF) is mainly responsible for session management and IP address allocation.

A User Plane Function (UPF) is a connection point for external Protocol Data Unit (PDU) sessions, and is responsible for routing, forwarding and policy execution of packet data.

A Policy Function (PCF) is mainly responsible for making policy decisions.

Figure 1:
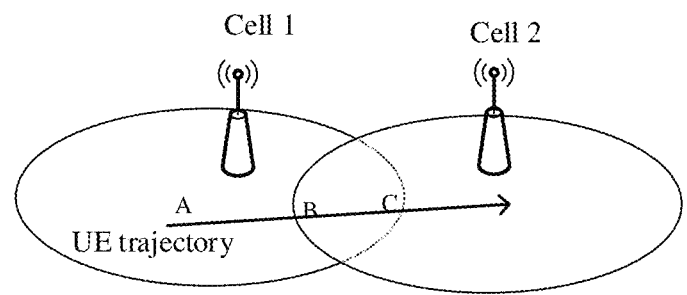
FIG. 1 is a schematic diagram of a motion trajectory of a UE in a radio network.

FIG. 1 is a schematic diagram of a motion trajectory of a UE in a radio network. The UE moves from a cell 1 to a cell 2. A point A denotes that the UE is only located in a radio signal coverage area of the cell 1; a point B denotes that the UE is still in the radio signal coverage area of the cell 1 and enters a radio signal coverage area of the cell 2; and a C point denotes that the UE almost leaves the radio signal coverage area of the cell 1, and a radio signal of the cell 2 is getting better and better. In the embodiment of the present disclosure, the cells 1 and 2 may be cells defined in the 5G system or in the existing art. A physical deployment form of each of the cells 1 and 2 is not limited. Related functions of the cells may be integratedly deployed on one physical device, or different functions may be deployed on different physical devices.

Figure 2:
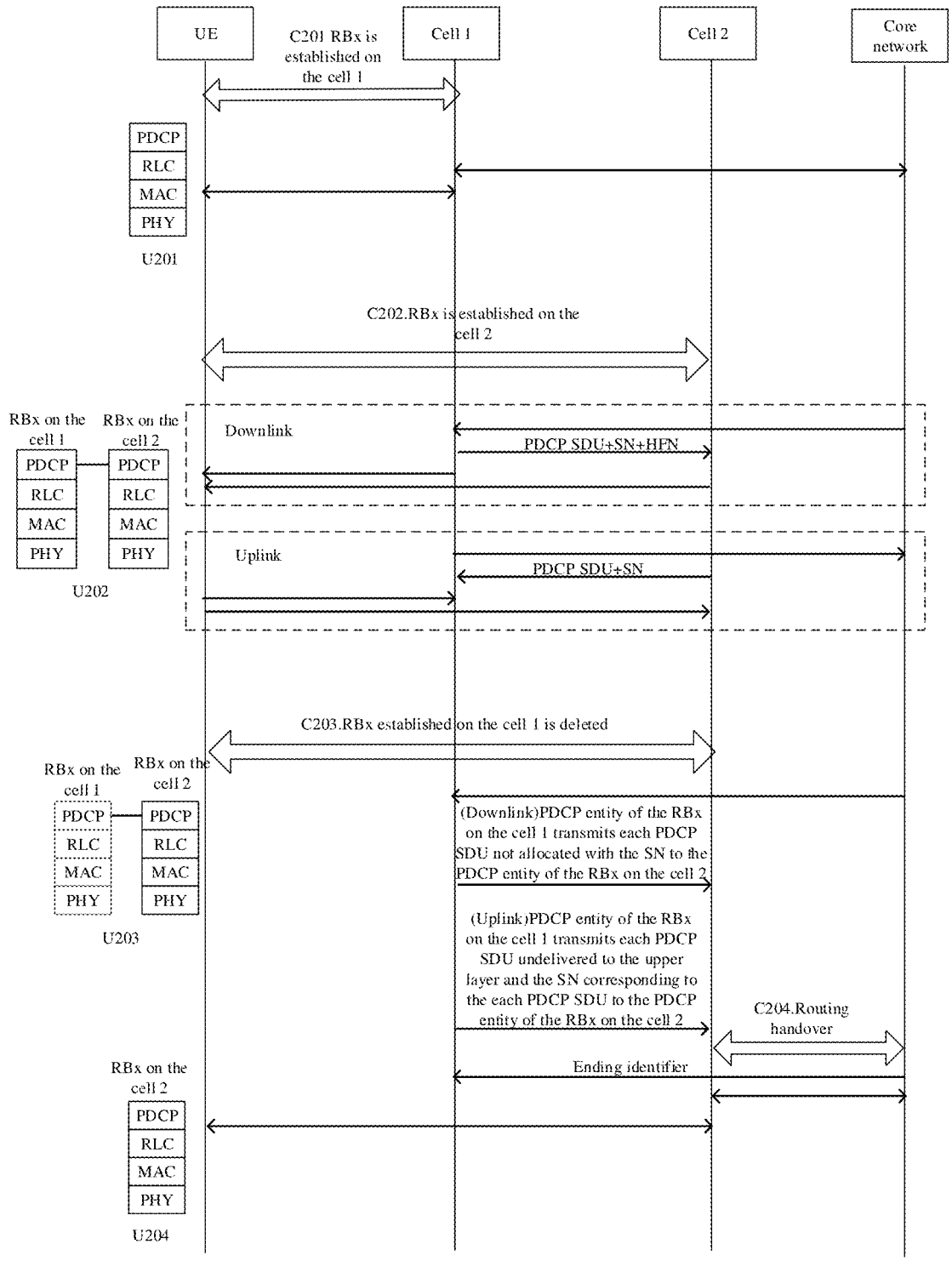
FIG. 2 is a flowchart of a zero-interrupt data transmission according to an embodiment of the present disclosure.

Based on the motion trajectory of the UE shown in FIG. 1, FIG. 2 illustrates a control plane signaling process, a user plane data transmission process and a protocol stack change process of a zero-interrupt data transmission according to an embodiment of the present disclosure. The control plane signaling process is marked by hollow arrows, and the user plane data transmission process is marked by single solid lines with arrows.

A process corresponding to the point A shown in FIG. 1 includes the steps described below.

In step C201, an RBx is established between a UE and the cell 1. The RBx is used for differentiating different RBs, a value of x is any one of 1 to 32, such as RB1, RB2, . . . , RB32. The RBx described hereinafter is similar.

As shown by U201 in FIG. 2, a PDCP entity, an RLC entity and a logical channel of the RBx are all established on the UE and the cell 1.

For a downlink data transmission, after transmitting from a core network to the cell 1, the data is transmitted from the cell 1 to the UE through the RBx. For an uplink data transmission, the UE transmits the data to the cell 1 through the RBx, and transmits the data to the core network from the cell 1.

As the UE moves, the UE moves to the point B shown in FIG. 1.

In step C202, an RBx is established between the UE and the cell 2.

As shown by U202 in FIG. 2, the PDCP entity, the RLC entity and the logical channel of the RBx are all established on the cell 1 and the PDCP entity, the RLC entity and the logical channel of the RBx are established on the cell 2. In the UE, the PDCP entity, the RLC entity and the logical channel established for the RBx on the cell 1 as shown by U202 in FIG. 2, and the PDCP entity, the RLC entity and the logical channel established for the RBx on the cell 2 as shown by U202 in FIG. 2 are possessed at the same time.

For a downlink data transmission, at a transmitting end (the cells 1 and 2), after the data is transmitted from the core network to the cell 1, the PDCP entity of the RBx on the cell 1 allocates an SN and an HFN for the data (i.e. PDCP SDU). The PDCP entity of the RBx on the cell 1 processes the PDCP SDU according to the generated SN and HFN, and generates a PDCP PDU. The PDCP entity of the RBx on the cell 1 transmits the PDCP SDU as well as the SN and HFN allocated for the PDCP SDU to the PDCP entity of the RBx on the cell 2, and the PDCP entity on the cell 2 processes the PDCP SDU according to the received SN and HFN and generates a PDCP PDU. The PDCP entity of the RBx on the cell 1 transmits the generated PDCP PDU to a lower layer protocol RLC entity of the RBx on the cell 1, and finally the PDCP PDU is transmitted to the UE through an air interface between the cell 1 and the UE. The PDCP entity of the RBx on the cell 2 transmits the generated PDCP PDU to a lower layer protocol RLC entity of the RBx on the cell 2, and finally the PDCP PDU is transmitted to the UE through an air interface between the cell 2 and the UE.

At a receiving end (the UE), the UE separately receives data on the RBx through an air interface with the cell 1, and receives data on the RBx through the air interface with the cell 2. After receiving the PDCP PDU, the PDCP entity of the RBx on the cell 1 in the UE processes the PDCP PDU and obtains the PDCP SDU and the SN corresponding to the PDCP SDU. After receiving the PDCP PDU, the PDCP entity of the RBx on the cell 2 in the UE processes the PDCP PDU and transmits the PDCP SDU obtained by processing the PDCP PDU and the SN corresponding to the PDCP SDU to the PDCP entity of the RBx on the cell 1 in the UE. After performing duplicate packet detection and reordering on the PDCP SDU obtained through processing of the PDCP entity of the RBx on the cell 1 in the UE and the PDCP SDU received from the cell 2, the PDCP entity of the RBx on the cell 1 in the UE delivers the PDCP SDUs to an upper layer. Here, the upper layer of the PDCP is a protocol layer above the PDCP, such as a TCP layer, or an IP layer, or a UDP layer, or an application layer.

For an uplink data transmission, at the transmitting end (the UE), after the PDCP entity of the RBx on the cell 1 in the UE receives data from the upper layer, the PDCP entity of the RBx on the cell 1 allocates an SN and an HFN to the data, i.e., a PDCP SDU. The PDCP entity of the RBx on the cell 1 processes the PDCP SDU according to the generated SN and HFN, and generates a PDCP PDU. The PDCP entity of the RBx on the cell 1 in the UE transmits the PDCP SDU as well as the SN and HFN allocated for the PDCP SDU to the PDCP entity of the RBx on the cell 2 in the UE, and the PDCP entity of the RBx on the cell 2 processes the PDCP SDU according to the received SN and HFN and generates a PDCP PDU. The PDCP entity of the RBx on the cell 1 in the UE transmits the generated PDCP PDU to the lower layer protocol RLC entity of the RBx on the cell 1 in the UE, and finally the PDCP PDU is transmitted to the cell 1 through the air interface between the cell 1 and the UE. The PDCP entity of the RBx on the cell 2 in the UE transmits the generated PDCP PDU to the lower layer protocol RLC entity of the RBx on the cell 2 in the UE, and finally the PDCP PDU is transmitted to the cell 2 through the air interface between the cell 2 and the UE.

At the receiving end (the cells 1 and 2), the cell 1 receives data on the RBx through the air interface with the UE, and the cell 2 receives data on the RBx through the air interface with the UE. After receiving the PDCP PDU, the PDCP entity on the cell 1 processes the PDCP PDU and obtains the PDCP SDU and the SN corresponding to the PDCP SDU. After receiving the PDCP PDU, the PDCP entity of the RBx on the cell 2 processes the PDCP PDU and transmits the PDCP SDU obtained by the processing and the SN corresponding to the PDCP SDU to the PDCP entity of the RBx on the cell 1. After performing duplicate packet detection and reordering on the PDCP SDU obtained through the processing of the PDCP entity of the RBx on the cell 1 and the PDCP SDU received from the cell 2, the PDCP entity of the RBx on the cell 1 transmits the PDCP SDUs to the core network.

Figure 3:
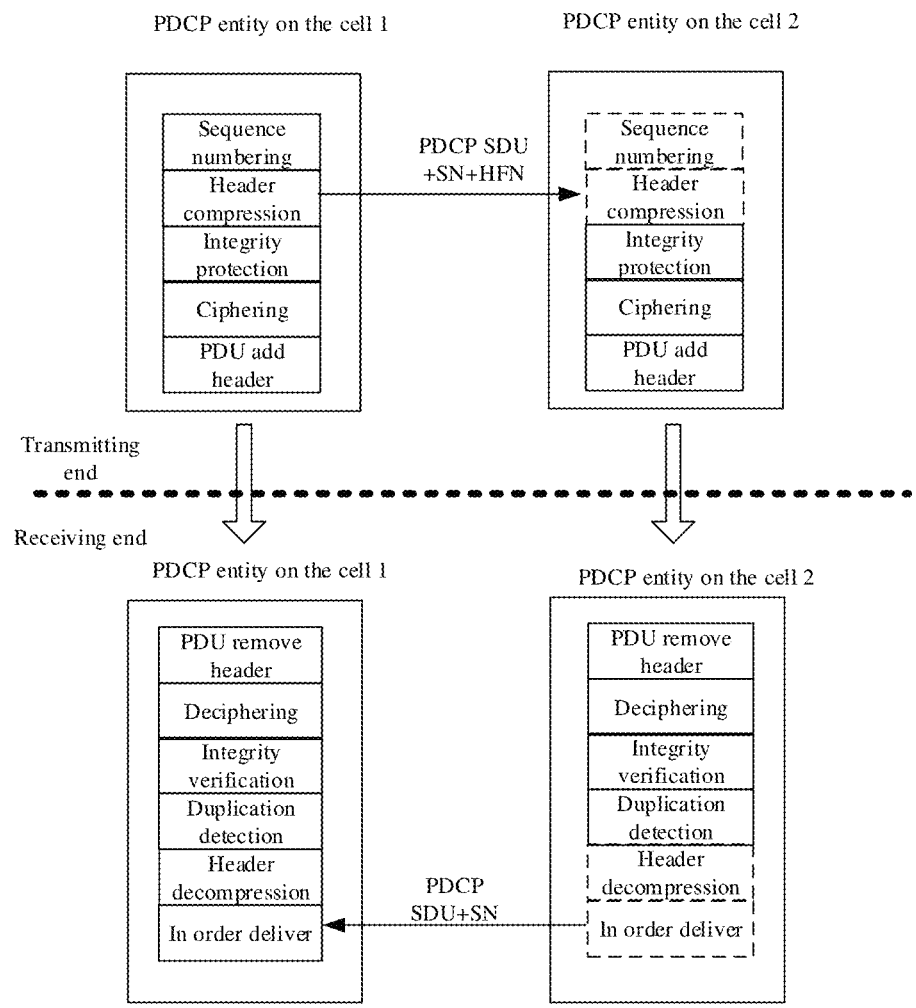
FIG. 3 is a structural diagram 1 of PDCP entities at a transmitting end and a receiving end according to an embodiment of the present disclosure.

FIG. 3 gives a processing process of the PDCP entities of the RBxs at the transmitting end and the receiving end when the UE is located between the point B and the point C (including the point B). It is to be noted that both the transmitting end and the receiving end are for the data transmission on an air interface (Uu) in the embodiment of the present disclosure. For the downlink data transmission, the transmitting end is located on a network side, i.e., located on the cell 1 and the cell 2, and the receiving end is located on a UE side. For the uplink data transmission, the transmitting end is located on the UE side, and the receiving end is located on the network side, i.e., located on the cell 1 and the cell 2.

A processing process of the PDCP entity at the transmitting end is described as follows.

As shown in FIG. 3, the PDCP entity of the RBx at the transmitting end on the cell 1 and the PDCP entity of the RBx at the transmitting end on the cell 2 both include the following functions:

sequence numbering, header compression, an integrity protection function, a ciphering function and a PDU add header function.

Whether any of the above functions can be used or not, it may be configured, i.e., not all functions are used, for example, the network may control whether the integrity protection and the ciphering are used.

In the process, the PDCP entity of the RBx at the transmitting end on the cell 1 and the PDCP entity of the RBx at the transmitting end on the cell 2 are used together. During the process, the PDCP entity of the RBx at the transmitting end on the cell 2 does not enable the sequence numbering function, and the header compression function may be enabled or not enabled.

The PDCP entity of the RBx at the transmitting end on the cell 1 receives a data packet from the upper layer or the core network. For example, for the downlink data transmission, the PDCP entity of the RBx at the transmitting end on the cell 1 is located on the network side of the cell 1, and the cell 1 receives downlink data (i.e., the PDCP SDU) from the core network through an interface between the cell 1 and the core network. For the uplink data transmission, the PDCP entity of the RBx at the transmitting end on the cell 1 is located on the UE, and receives data (i.e., the PDCP SDU) from the upper layer in the UE.

The PDCP entity of the RBx at the transmitting end on the cell 1 allocates the SN and the HFN for the PDCP SDU, and transmits the PDCP SDU and the allocated SN and HFN to the PDCP entity of the RBx at the transmitting end on the cell 2. Here, for the downlink data transmission, the PDCP entity of the RBx at the transmitting end on the cell 1 is located on the network side of the cell 1, and the PDCP entity of the RBx at the transmitting end on the cell 2 is located on the network side of the cell 2, and these two PDCP entities are connected to each other through an X interface. Then the PDCP entity of the RBx at the transmitting end on the cell 1 transmits the PDCP SDU and the allocated SN and HFN to the PDCP entity of the RBx at the transmitting end on the cell 2 through the X interface. In the embodiment of the present disclosure, if the PDCP entity of the RBx at the transmitting end on the cell 2 enables the header compression function, then in a case that the header compression needs to be performed, the PDCP SDU transmitted by the PDCP entity of the RBx at the transmitting end on the cell 1 to the PDCP entity of the RBx at the transmitting end on the cell 2 is a PDCP SDU without being processed by the header compression. If the PDCP entity of the RBx at the transmitting end on the cell 2 does not enable the header compression function in the process, then in a case that the header compression needs to be performed, the PDCP SDU transmitted by the PDCP entity of the RBx at the transmitting end on the cell 1 to the PDCP entity of the RBx at the transmitting end on the cell 2 is a PDCP SDU having been processed by the header compression.

The PDCP entity of the RBx at the transmitting end on the cell 1 processes the PDCP SDU according to the generated SN and HFN and generates a PDCP PDU. The processing includes that if the header compression needs to be performed, the header compression is performed on the PDCP SDU; if the integrity protection needs to be performed, the integrity protection is performed the PDCP PDU according to the SN and HFN; if the ciphering needs to be performed, the ciphering is performed on the PDCP PDU according to the SN and HFN; and a packet header of the PDCP PDU is generated according to the SN.

The PDCP entity of the RBx at the transmitting end on the cell 2 processes the PDCP SDU according to the SN and HFN received from the PDCP of the RBx on the cell 1 and generates a PDCP PDU. The processing includes that if the PDCP entity of the RBx on the cell 2 enables the header compression, then if the header compression needs to be performed, the header compression is performed on the PDCP SDU; if the integrity protection needs to be performed, the integrity protection is performed on the PDCP PDU according to the SN and HFN; if the ciphering needs to be performed, the ciphering is performed on the PDCP PDU the according to the SN and HFN; and a packet header of the PDCP PDU is generated according to the SN.

Here, the PDCP entity of the RBx at the transmitting end on the cell 1 and the PDCP entity of the RBx at the transmitting end on the cell 2 cipher the PDCP PDU separately by using their own ciphering security keys, the ciphering security keys of these two may be the same or different. And the PDCP entity of the RBx at the transmitting end on the cell 1 and the PDCP entity of the RBx at the transmitting end on the cell 2 perform the integrity protection by using their own integrity protection keys, the integrity protection keys of these two may be the same or different.

The PDCP entity of the RBx at the transmitting end on the cell 1 transmits the generated PDCP PDU to a lower layer protocol RLC entity of the RBx on the cell 1, and finally the PDCP PDU is transmitted to the UE through an air interface between the cell 1 and the UE. The PDCP entity of the RBx at the transmitting end on the cell 2 transmits the generated PDCP PDU to a lower layer protocol RLC entity of the RBx on the cell 2, and finally the PDCP PDU is transmitted to the UE through an air interface between the cell 2 and the UE.

A processing process of the PDCP entity at the receiving end is described as follows.

As shown in FIG. 3, the PDCP entity of the RBx at the receiving end on the cell 1 and the PDCP entity of the RBx at the receiving end on the cell 1 both include the following functions:

a protocol data unit (PDU) remove header function; a deciphering function, an integrity verification function, a duplication detection function, a header decompression function, and an in order deliver function.

Whether any of the above functions can be used or not, it may be configured, i.e., not all functions are used, for example, the network may control whether the integrity verification function and the deciphering function are used.

In to process, the PDCP entity of the RBx at the receiving end on the cell 1 and the PDCP entity of the RBx at the receiving end on the cell 2 are used together. During the process, the PDCP entity of the RBx at the receiving end on the cell 2 may or may not enable the in order deliver function. The PDCP entity of the RBx at the receiving end on the cell 2 may or may not enable the header decompression function.

After receiving the PDCP PDU, the PDCP entity of the RBx at the receiving end on the cell 2 processes the PDCP PDU and obtains the PDCP SDU and the SN corresponding to the PDCP SDU. The processing includes: removing a PDU header from the PDCP PDU, acquiring the SN from the PDU header, and determining the HFN according to the SN; if the deciphering needs to be performed, performing the deciphering on the PDCP PDU according to the acquired SN and HFN; if the integrity verification needs to be performed, performing the integrity verification on the PDCP PDU according to the acquired SN and HFN; performing the duplication detection function on the PDCP SDU obtained by processing the PDCP PDU, discarding a duplicatedly received PDCP SDU; if the PDCP entity of the RBx at the receiving end on the cell 2 enables the header decompression function, then if the header decompression function needs to be performed, performing the header decompression on the PDCP SDU; if the PDCP entity of the RBx at the receiving end on the cell 2 enables the in order deliver function, ordering received PDCP SDUs. The PDCP entity of the RBx at the receiving end on the cell 2 transmits the PDCP SDU and the corresponding SN to the PDCP entity of the RBx at the receiving end on the cell 1. Here, for the uplink data transmission, the PDCP entity of the RBx at the receiving end on the cell 1 is located on the network side of the cell 1, and the PDCP entity of the RBx at the receiving end on the cell 2 is located on the network side of the cell 2, and these two are connected to each other through the X interface. Then the PDCP entity of the RBx at the receiving end on the cell 2 transmits the PDCP SDU and the SN to the PDCP entity of the RBx at the receiving end on the cell 2 through the X interface.

After receiving the PDCP PDU, the PDCP entity of the RBx at the receiving end on the cell 1 processes the PDCP PDU and obtains the PDCP SDU and the SN corresponding to the PDCP SDU. The processing includes that: removing the PDU header from the PDCP PDU, acquiring the SN from the PDU header, and determining the HFN according to the SN; if the deciphering needs to be performed, performing the deciphering on the PDCP PDU according to the acquired SN and HFN; if the integrity verification needs to be performed, performing the integrity verification on the PDCP PDU according to the acquired SN and HFN; if the decompression needs to be performed, performing the decompression on the PDCP SDU. After the PDCP entity of the RBx at the receiving end on the cell 1 receives the PDCP SDU and the SN transmitted by the PDCP entity of the RBx at the receiving end on the cell 2, if the PDCP entity of the RBx at the receiving end on the cell 2 does not enable the header decompression function in the embodiment of the present disclosure, if the header decompression function needs to be performed, the PDCP entity of the RBx on the cell 1 performs the header decompression on the PDCP SDU received from the PDCP entity of the RBx on the cell 2.

The PDCP entity of the RBx on the cell 1 performs the duplication detection function on PDCP SDU obtained by its own processing and the PDCP SDU received from the cell 2, discards the duplicated PDCP SDU, and then performs in-order processing and delivers PDCP SDUs to the upper layer or transmits the PDCP SDUs to the core network, for example, for the downlink data transmission, the PDCP entity of the RBx at the receiving end on the cell 1 is located on the UE, and delivers the PDCP SDU to the upper layer, and for the uplink data transmission, the PDCP entity of the RBx at the receiving end on the cell 1 is located on the network side of the cell 1 and transmits the PDCP SDU to the core network.

As the UE moves, the UE moves to the point C shown in FIG. 1.

In step C203, the RBx established on the cell 1 is deleted.

After the RBx established on the cell 1 is deleted, data transmission between the UE and the cell 1 on the RBx through a Uu interface is stopped.

For a downlink data transmission,
at the transmitting end (the cells 1 and 2, but on RBx at this time, only the transmitting end on the cell 2 performs data transmission with the UE through the Uu interface): the PDCP entity of the RBx at the receiving end on the cell 1 transmits each PDCP SDU not allocated with the SN to the PDCP entity of the RBx on the cell 2;
at the receiving end:
before deleting the PDCP entity, the PDCP entity of the RBx on the cell 1 in the UE transmits each PDCP SDU undelivered to the upper layer and the SN corresponding to the each PDCP SDU to the PDCP entity of the RBx on the cell 2 in the UE.

For an uplink data transmission,
at the transmitting end (UE): the PDCP entity of the RBx on the cell 1 in the UE transmits each PDCP SDU not allocated with the SN to the PDCP entity of the RBx on the cell 2 in the UE.
at the receiving end (the cells 1 and 2, but on RBx at this time, only the receiving end on the cell 2 performs data transmission with the UE through the Uu interface): before deleting the PDCP entity, the PDCP entity of the RBx on the cell 1 transmits each PDCP SDU undelivered to the upper layer and the SN corresponding to the each PDCP SDU to the PDCP entity of the RBx on the cell 2.

Figure 4:
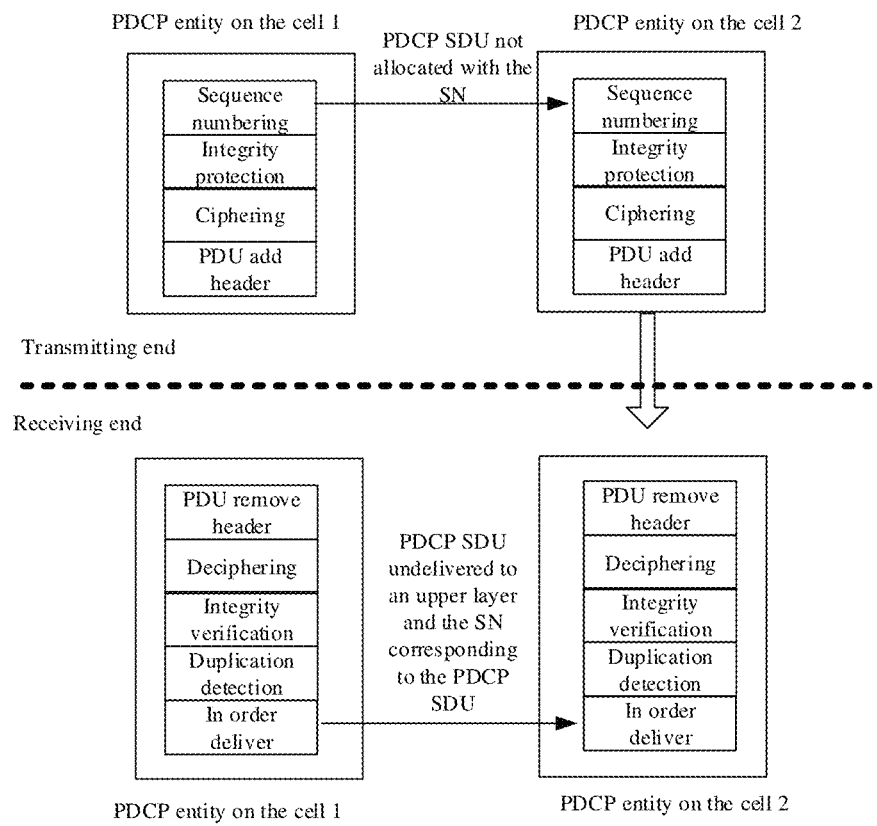
FIG. 4 is a structural diagram 2 of PDCP entities at a transmitting end and a receiving end according to an embodiment of the present disclosure.

FIG. 4 gives a processing process of the PDCP entities of the RBxs at the transmitting end and the receiving end when the UE is located at the point C.

A processing process of the PDCP entity at the transmitting end includes:
before deleting the PDCP entity, the PDCP entity of the RBx on the cell 1 transmits each PDCP SDU undelivered to the upper layer and the SN corresponding to the each PDCP SDU to the PDCP entity of the RBx on the cell 2.

A processing process of the PDCP entity at the receiving end includes:

before deleting the PDCP entity, the PDCP entity of the RBx on the cell 1 transmits each PDCP SDU undelivered to the upper layer and the SN corresponding to the each PDCP SDU to the PDCP entity of the RBx on the cell 2.

Figure 5:
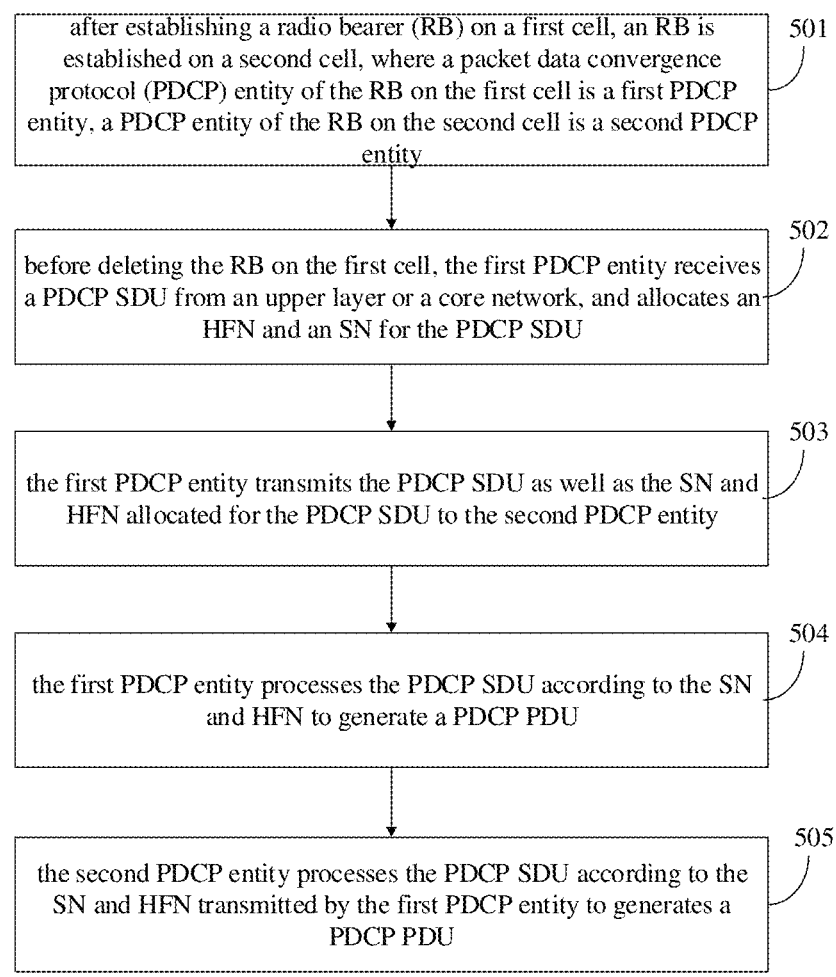
FIG. 5 is a flowchart 1 of a data transmission method according to an embodiment of the present disclosure.

Based on the above embodiments, a data transmission method at a transmitting end according to an embodiment of the present disclosure is shown in FIG. 5. The method includes the step described below.

In step 501, after establishing a radio bearer (RB) on a first cell, an RB is established on a second cell, where a packet data convergence protocol (PDCP) entity of the RB on the first cell is a first PDCP entity, a PDCP entity of the RB on the second cell is a second PDCP entity.

Here, the establishing the RB on the second cell includes: establishing a PDCP entity, a radio link control (RLC) entity and a logical channel on the second cell.

In step 502, before deleting the RB on the first cell, the first PDCP entity receives a PDCP SDU from an upper layer or a core network, and allocates an HFN and an SN for the PDCP SDU.

In step 503, the first PDCP entity transmits the PDCP SDU as well as the SN and HFN allocated for the PDCP SDU to the second PDCP entity.

In step 504, the first PDCP entity processes the PDCP SDU according to the SN and HFN to generate a PDCP PDU.

Here, if the PDCP PDU needs to be processed by ciphering and/or integrity protection, the ciphering and/or the integrity protection is performed on the PDCP PDU according to the SN and the HFN; a packet header of the PDCP PDU is generated according to the SN.

The first PDCP entity ciphers the PDCP PDU with an ciphering and deciphering security key of the first PDCP entity; and the first PDCP entity uses an integrity protection key of the first PDCP entity to perform the integrity protection on the PDCP PDU.

In step 505, the second PDCP entity processes the PDCP SDU according to the SN and HFN transmitted by the first PDCP entity to generates a PDCP PDU.

Here, if the PDCP PDU needs to be processed by ciphering and/or integrity protection, the ciphering and/or the integrity protection is performed on the PDCP PDU according to the SN and the HFN; a packet header of the PDCP PDU is generated according to the SN.

The second PDCP entity ciphers the PDCP PDU with an ciphering and deciphering security key of the second PDCP entity; and the second PDCP entity uses an integrity protection key of the second PDCP entity to perform the integrity protection on the PDCP PDU.

In the embodiment of the present disclosure, if the first PDCP entity is located at a first device, the second PDCP entity is located at a second device, and the first device and the second device are connected to each other through an X interface, then the first PDCP entity transmits the PDCP SDU as well as the SN and the HFN allocated for the PDCP SDU to the second entity through the X interface.

In the embodiment of the present disclosure, the method includes:
deleting the RB on the first cell; and transmitting each PDCP SDU not allocated with the SN in the first PDCP entity to the second PDCP entity.

Figure 6:
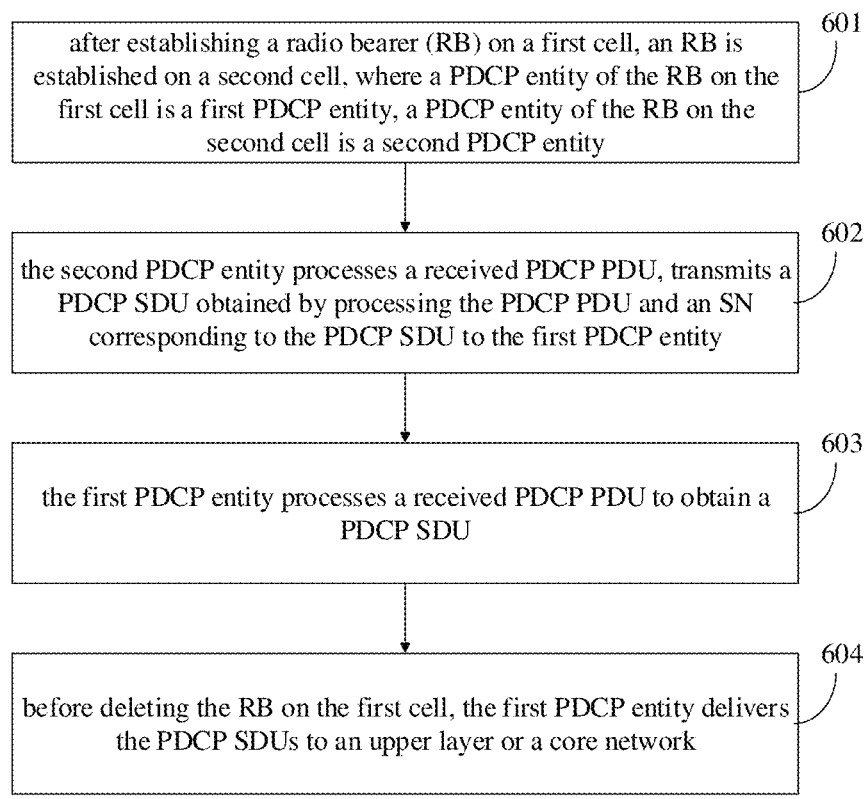
FIG. 6 is a flowchart 2 of a data transmission method according to an embodiment of the present disclosure.

Based on the above embodiments, a data transmission method at a receiving end according to an embodiment of the present disclosure is shown in FIG. 6. The method includes:

In step 601, after establishing a radio bearer (RB) on a first cell, an RB is established on a second cell, where a PDCP entity of the RB on the first cell is a first PDCP entity, a PDCP entity of the RB on the second cell is a second PDCP entity.

Here, a PDCP entity, a radio link control (RLC) entity and a logical channel are established on the second cell.

In step 602, the second PDCP entity processes a received PDCP PDU, transmits a PDCP SDU obtained by processing the PDCP PDU and an SN corresponding to the PDCP SDU to the first PDCP entity.

Here, an SN is acquired from a packet header of the PDCP PDU; if the PDCP PDU needs to be processed by deciphering and/or integrity verification, the deciphering and/or the integrity verification is performed on the PDCP PDU.

The second PDCP entity deciphers the PDCP PDU with an ciphering and deciphering security key of the second PDCP entity; and the second PDCP entity uses an integrity protection key of the second PDCP entity to perform the integrity verification on the PDCP PDU.

In step 603, the first PDCP entity processes a received PDCP PDU to obtain a PDCP SDU.

Here, an SN is acquired from a packet header of the PDCP PDU; if the PDCP PDU needs to be processed by deciphering and/or integrity verification, the deciphering and/or the integrity verification is performed on the PDCP PDU.

The first PDCP entity deciphers the PDCP PDU with an ciphering and deciphering security key of the first PDCP entity; and the first PDCP entity uses an integrity protection key of the first PDCP entity to perform the integrity verification on the PDCP PDU.

In step 604, before deleting the RB on the first cell, the first PDCP entity delivers the PDCP SDUs to an upper layer or a core network.

In the embodiment of the present disclosure, if the first PDCP entity is located at a first device, the second PDCP entity is located at a second device, and the first device and the second device are connected to each other through an X interface, then the second PDCP entity transmits the PDCP SDU obtained by processing the PDCP PDU as well as the SN corresponding to the PDCP SDU to the first PDCP entity through the X interface.

In the embodiment of the present disclosure, before the first PDCP entity delivers the PDCP SDU to the upper layer or the core network, the method further includes:
performing, by the first PDCP entity, a duplicate packet detection and reordering on the PDCP SDU obtained by processing of the first PDCP entity and the PDCP SDU transmitted by the second PDCP entity.

In the embodiment of the present disclosure, the method includes:
deleting the RB on the first cell; and transmitting each PDCP SDU undelivered to the upper layer or the core network in the first PDCP entity and an SN corresponding to the each PDCP SDU to the second PDCP entity.

Figure 7:
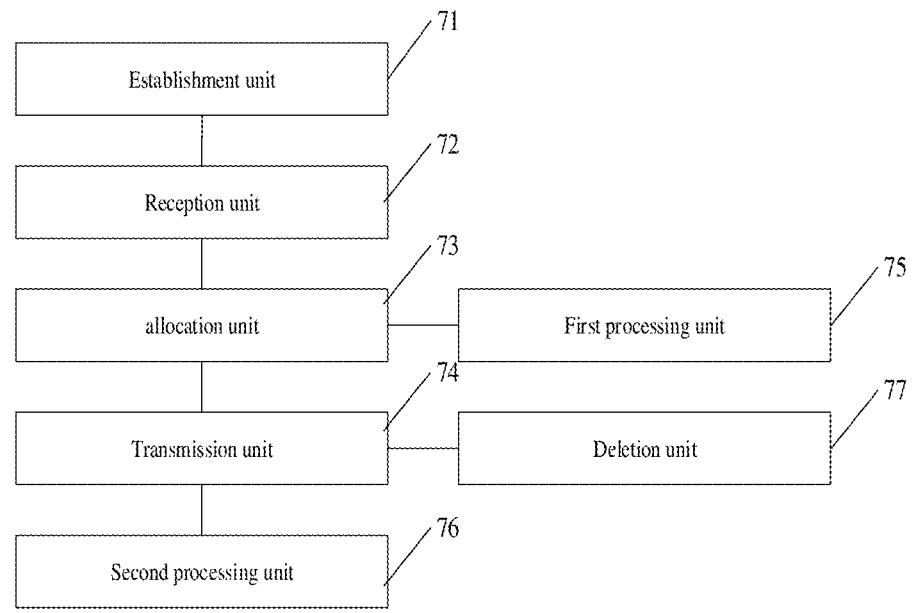
FIG. 7 is a structural diagram 1 of a data transmission apparatus according to an embodiment of the present disclosure.

FIG. 7 is a structural diagram 1 of a data transmission apparatus according to an embodiment of the present disclosure. As shown in FIG. 7, the apparatus includes:
an establishment unit 71, which is configured to, after establishing a radio bearer (RB) on a first cell, establish an RB on a second cell, where a PDCP entity on the first cell is a first PDCP entity, a PDCP entity of the RB on the second cell is a second PDCP entity;
a reception unit 72, which is configured to, before deleting the RB on the first cell, enable the first PDCP entity to receive a PDCP SDU from an upper layer or a core network;

an allocation unit 73, which is configured to allocate an SN and an HFN for the PDCP SDU;

a transmission unit 74, which is configured to enable the first PDCP entity to transmit the PDCP SDU as well as the SN and HFN allocated for the PDCP SDU to the second PDCP entity;

a first processing unit 75, which is configured to enable the first PDCP entity to process the PDCP SDU according to the SN and the HFN to generate a PDCP PDU;

a second processing unit 76, which is configured to enable the second PDCP entity to process the PDCP SDU according to the SN and HFN transmitted by the first PDCP entity to generate a PDCP PDU.

In the embodiment of the present disclosure, the establishment unit 71 is further configured to establish the PDCP entity, an RLC entity and a logical channel on the second cell.

In the embodiment of the present disclosure, the first processing unit 75 is configured to: if the PDCP PDU needs to be processed by ciphering and/or integrity protection, perform the ciphering and/or the integrity protection on the PDCP PDU according to the SN and the HFN; and generate a packet header of the PDCP PDU according to the SN.

The first PDCP entity ciphers the PDCP PDU with an ciphering and deciphering security key of the first PDCP entity; and the first PDCP entity uses an integrity protection key of the first PDCP entity to perform the integrity protection on the PDCP PDU.

In the embodiment of the present disclosure, the second processing unit 76 is configured to: if the PDCP PDU needs to be processed by ciphering and/or integrity protection, perform the ciphering and/or the integrity protection on the PDCP PDU according to the SN and the HFN; and generate a packet header of the PDCP PDU according to the SN.

The second PDCP entity ciphers the PDCP PDU with an ciphering and deciphering security key of the second PDCP entity; and the second PDCP entity uses an integrity protection key of the second PDCP entity to perform the integrity protection on the PDCP PDU.

In the embodiment of the present disclosure, if the first PDCP entity is located at a first device, the second PDCP entity is located at a second device, and the first device and the second device are connected to each other through an X interface, then the transmission unit is used for transmitting the PDCP SDU as well as the SN and the HFN allocated for the PDCP SDU to the second PDCP entity through the X interface.

In the embodiment of the present disclosure, the apparatus further includes:

a deletion unit 77, which is configured to delete the RB on the first cell.

The transmission unit 74 is further used for transmitting each PDCP SDU not allocated with the SN in the first PDCP entity to the second PDCP entity.

It should be understood by those skilled in the art that implementation of functions of various units of the data transmission apparatus in FIG. 7 may be understood with reference to the related description of the foregoing data transmission method.

Figure 8:
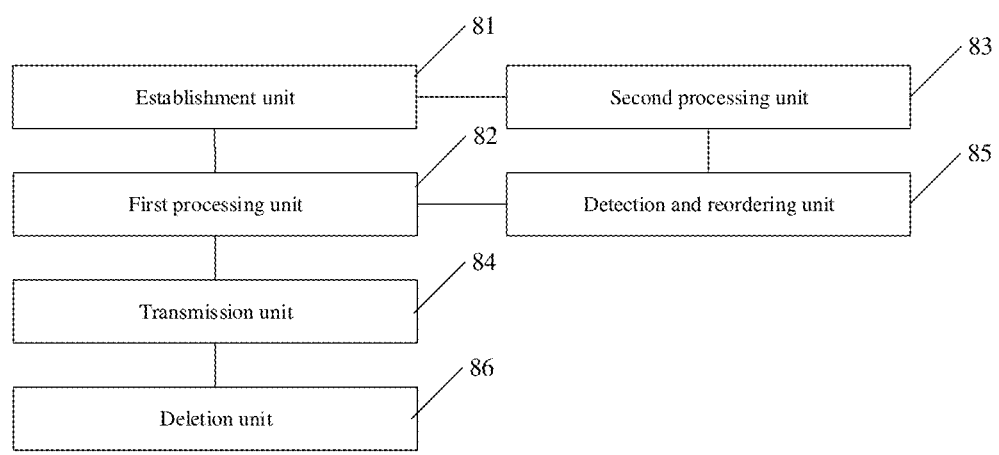
FIG. 8 is a structural diagram 2 of a data transmission apparatus according to an embodiment of the present disclosure.

FIG. 8 is a structural diagram 2 of a data transmission apparatus according to an embodiment of the present disclosure. As shown in FIG. 8, the apparatus includes:

an establishment unit 81, which is configured to, after establishing a radio bearer (RB) on a first cell, establish an RB on a second cell, where a PDCP entity of the RB on the first cell is a first PDCP entity, a PDCP entity of the RB on the second cell is a second PDCP entity;

a first processing unit 82, which is used for enabling the second PDCP entity to process a received PDCP PDU and transmit the PDCP SDU obtained by processing the PDCP PDU and a SN corresponding to the PDCP SDU to the first PDCP entity;

a second processing unit 83, which is used for enabling the first PDCP entity to process a received PDCP PDU to obtain a PDCP SDU; and a transmission unit 84, which is used for, before deleting the RB on the first cell, enabling the first PDCP entity to deliver the PDCP SDU to an upper layer or a core network.

In the embodiment of the present disclosure, the establishment unit 81 is used for establishing the PDCP entity, an RLC entity and a logical channel on the second cell.

In the embodiment of the present disclosure, the first processing unit 82 is used for acquiring the SN from a packet header of the PDCP PDU; and in a case that the PDCP PDU needs to be processed by deciphering and/or integrity verification, performing the deciphering and/or the integrity verification on the PDCP PDU;

where the second PDCP entity deciphers the PDCP PDU with an ciphering and deciphering security key of the second PDCP entity; and the second PDCP entity uses an integrity protection key of the second PDCP entity to perform the integrity verification on the PDCP PDU.

In the embodiment of the present disclosure, the second processing unit 83 is used for acquiring the SN from a packet header of the PDCP PDU; and in a case that the PDCP PDU needs to be processed by deciphering and/or integrity verification, performing the deciphering and/or the integrity verification on the PDCP PDU;

where the first PDCP entity deciphers the PDCP PDU with an ciphering and deciphering security key of the first PDCP entity; and the first PDCP entity uses an integrity protection key of the first PDCP entity to perform the integrity verification on the PDCP PDU.

In the embodiment of the present disclosure, if the first PDCP entity is located at a first device, the second PDCP entity is located at a second device, and the first device and the second device are connected to each other through an X interface, then the first processing unit transmits the PDCP SDU obtained by processing the PDCP PDU as well as the SN corresponding to the PDCP SDU to the first PDCP entity through the X interface.

In the embodiment of the present disclosure, the apparatus further includes:

a detection and reordering unit 85, which is configured to enable the first PDCP entity to perform a duplicate packet detection and reordering on the PDCP SDU transmitted by the second PDCP entity and the PDCP SDU obtained by processing of the first PDCP entity.

In the embodiment of the present disclosure, the apparatus further includes:

a deletion unit 86, which is used for deleting the RB on the first cell; and the transmission unit 84 is further used for transmitting each PDCP SDU undelivered to the upper layer or the core network in the first PDCP entity and an SN corresponding to the each PDCP SDU to the second PDCP entity.

It should be understood by those skilled in the art that implementation of functions of various units of the data transmission apparatus in FIG. 8 may be understood with reference to the related description of the foregoing data transmission method.

The solution in the embodiments of the present disclosure, for a device without a gesture recognition component (such as a device not provided with a camera), may control the device (such as selecting functions or configuring parameters) with gesture instead of facing the device, and the device itself has a low extra cost.

It should be understood by those skilled in the art that the embodiments of the present disclosure may be provided as methods, systems or computer program products. Therefore, the present disclosure may be implemented by hardware, software, or a combination of hardware and software. In addition, the present disclosure may take the form of a computer program product implemented in one or more computer-usable storage media (including, but not limited to, a disk memory and an optical memory) that includes computer-usable program codes.

The present invention is described with reference to flowcharts and/or block diagrams of methods, devices (systems) and computer program products according to the embodiments of the present invention. It is to be understood that the computer program instructions can be used to implement each flow and/or block in the flowcharts and/or block diagrams and a combination of flows and/or blocks in the flowcharts and/or block diagrams. These computer program instructions may be provided to a general-purpose computer, a special-purpose computer, an embedded processor or a processor of another programmable data processing device to produce a machine so that instructions executed by a computer or the processor of another programmable data processing device produce an apparatus for implementing functions designated in one or more flows in the flowcharts and/or one or more blocks in the block diagrams.

These computer program instructions may also be stored in a computer-readable memory which can direct a computer or another programmable data processing device to operate in a particular manner so that the instructions stored in the computer-readable memory produce a manufactured product including an instructing apparatus. The instructing apparatus implements the functions designated in the one or more flows in the flowcharts and/or the one or more blocks in the block diagrams.

These computer program instructions may also be loaded onto the computer or another programmable data processing device so that a series of operations and steps are performed on the computer or another programmable device to produce processing implemented by the computer. Therefore, instructions executed on the computer or another programmable device provide steps for implementing the functions designated in the one or more flows in the flowcharts and/or the one or more blocks in the block diagrams.

The above are only preferred embodiments of the present disclosure and are not intended to limit the scope of the present disclosure.

INDUSTRIAL APPLICABILITY

In solutions of the embodiments of the present disclosure, a data transmission method at a transmitting end includes: after establishing a radio bearer (RB) on a first cell, establishing a RB on a second cell, where a packet data convergence protocol (PDCP) entity of the RB on the first cell is a first PDCP entity of the RB, a PDCP entity of the RB on the second cell is a second PDCP entity of the RB; before deleting the RB on the first cell, receiving, by the first PDCP entity, a packet data convergence protocol service data unit (PDCP SDU) of a core network or a protocol layer on the PDCP entity, and allocating a hyper frame number (HFN) and a sequence number (SN) for the PDCP SDU; processing, by the first PDCP entity, the PDCP SDU according to the SN and HFN and generating a first packet data convergence protocol packet data unit (PDCP PDU); transmitting, by the first PDCP entity, the PDCP SDU as well as the SN and HFN allocated for the PDCP SDU to the second PDCP entity; and processing, by the second PDCP entity, the PDCP SDU according to the SN and HFN transmitted by the first PDCP entity and generating a second PDCP PDU. A data transmission method at a receiving end includes: after establishing a radio bearer (RB) on a first cell, establishing an RB on a second cell, where a PDCP entity of the RB on the first cell is a first PDCP entity of the RB, a PDCP entity of the RB on the second cell is a second PDCP entity of the RB; processing, by the second PDCP entity, a received PDCP PDU, transmitting a second PDCP SDU obtained by processing the PDCP PDU and a SN corresponding to the second PDCP SDU to the first PDCP entity; processing, by the first PDCP entity, a received PDCP PDU, and obtaining a first PDCP SDU; before deleting the RB on the first cell, delivering, by the first PDCP entity, the first PDCP SDU and the second PDCP SDU to a protocol layer or a core network on the PDCP entity. The solutions of the embodiments of the present disclosure are able to implement zero-interrupt data transmission in a process where UE frequently switches between cells in 5G, ensuring the throughput and user experience in the process of frequent cell switching.

What is claimed is:

1. A data transmission method, comprising:
after establishing a radio bearer (RB) on a first cell, establishing an RB on a second cell, wherein a packet data convergence protocol (PDCP) entity of the RB on the first cell is a first PDCP entity of the RB, a PDCP entity of the RB on the second cell is a second PDCP entity of the RB;
before deleting the RB on the first cell, receiving, by the first PDCP entity, a packet data convergence protocol service data unit (PDCP SDU) from a core network or a protocol layer above the PDCP entity, and allocating, by the first PDCP entity, a hyper frame number (HFN) and a sequence number (SN) for the PDCP SDU;
processing, by the first PDCP entity, the PDCP SDU according to the SN and the HFN to generate a first packet data convergence protocol packet data unit (PDCP PDU), wherein the processing, by the first PDCP entity, the PDCP SDU according to the SN and the HFN to generate the first PDCP PDU comprises:
in a case that the first PDCP PDU needs to be processed by ciphering or integrity protection, performing the ciphering or the integrity protection on the PDCP PDU according to the SN and the HFN; and generating a packet header of the first PDCP PDU according to the SN;
wherein the first PDCP entity ciphers the PDCP PDU with an ciphering and deciphering security key of the first PDCP entity; and the first PDCP entity uses an integrity protection key of the first PDCP entity to perform the integrity protection on the PDCP PDU; and
wherein the processing, by the second PDCP entity, the PDCP SDU according to the SN and the HFN transmitted by the first PDCP entity to generate the second PDCP PDU comprises:
in a case that the PDCP PDU needs to be processed by ciphering or integrity protection, performing the ciphering or the integrity protection on the PDCP PDU according to the SN and the HFN; and generating a packet header of the second PDCP PDU according to the SN;
wherein the second PDCP entity ciphers the PDCP PDU with an ciphering and deciphering security key of the second PDCP entity; and the second PDCP entity uses an integrity protection key of the second PDCP entity to perform the integrity protection on the PDCP PDU;
transmitting, by the first PDCP entity, the PDCP SDU as well as the SN and the HFN allocated for the PDCP SDU to the second PDCP entity; and
processing, by the second PDCP entity, the PDCP SDU according to the SN and the HFN transmitted by the first PDCP entity, to generate a second PDCP PDU.

2. The data transmission method of claim 1, wherein the establishing the RB on the second cell comprises:
establishing the PDCP entity, a radio link control (RLC) entity and a logical channel on the second cell.

3. The data transmission method of claim 1, comprising:
deleting the RB on the first cell; and
transmitting each PDCP SDU not allocated with the SN in the first PDCP entity to the second PDCP entity.

4. A data transmission method, comprising:
after establishing a radio bearer (RB) on a first cell, establishing an RB on a second cell, wherein a packet data convergence protocol (PDCP) entity of the RB on the first cell is a first PDCP entity of the RB, a PDCP entity of the RB on the second cell is a second PDCP entity of the RB;
processing, by the second PDCP entity, a received packet data convergence protocol packet data unit (PDCP PDU), transmitting a second packet data convergence protocol service data unit (PDCP SDU) obtained by processing the PDCP PDU and a sequence number (SN) corresponding to the second PDCP SDU to the first PDCP entity, wherein the processing, by the second PDCP entity, the received PDCP PDU comprises:
acquiring the SN from a packet header of the PDCP PDU; and in a case that the PDCP PDU needs to be processed by deciphering or integrity verification, performing the deciphering or the integrity verification on the PDCP PDU;
wherein the second PDCP entity deciphers the PDCP PDU with an ciphering and deciphering security key of the second PDCP entity; and the second PDCP entity uses an integrity protection key of the second PDCP entity to perform the integrity verification on the PDCP PDU; and
wherein the processing, by the first PDCP entity, the received PDCP PDU comprises:
acquiring an SN from a packet header of the PDCP PDU; and in a case that the PDCP PDU needs to be processed by deciphering or integrity verification, performing the deciphering or the integrity verification on the PDCP PDU;
wherein the first PDCP entity deciphers the PDCP PDU with an ciphering and deciphering security key of the first PDCP entity; and the first PDCP entity uses an integrity protection key of the first PDCP entity to perform the integrity verification on the PDCP PDU;
processing, by the first PDCP entity, a received PDCP PDU to obtain a first PDCP SDU; and
before deleting the RB on the first cell, delivering, by the first PDCP entity, the first PDCP SDU and the second PDCP SDU to a protocol layer above the PDCP entity or to a core network.

5. The data transmission method of claim 4, wherein the establishing the RB on the second cell comprises:
establishing the PDCP entity, a radio link control (RLC) entity and a logical channel on the second cell.

6. The data transmission method of claim 4, wherein before delivering, by the first PDCP entity, the first PDCP SDU and the second PDCP SDU to the protocol layer above the PDCP entity or to the core network, the data transmission method further comprises:
performing, by the first PDCP entity, a duplicate packet detection and reordering on the second PDCP SDU transmitted by the second PDCP entity and the first PDCP SDU obtained by the processing of the first PDCP entity.

7. The data transmission method of claim 4, comprising:
deleting the RB on the first cell; and
transmitting each first PDCP SDU undelivered to the protocol layer above the PDCP entity or to the core network in the first PDCP entity and an SN corresponding to the each first PDCP SDU to the second PDCP entity, and transmitting each second PDCP SDU undelivered to the protocol layer above the PDCP entity or to the core network in the first PDCP entity and an SN corresponding to the each second PDCP SDU to the second PDCP entity.

8. A data transmission apparatus, comprising:
an establishment unit, which is configured to, after establishing a radio bearer (RB) on a first cell, establish an RB on a second cell, wherein a packet data convergence protocol (PDCP) entity of the RB on the first cell is a first PDCP entity of the RB, a PDCP entity of the RB on the second cell is a second PDCP entity of the RB;
a reception unit, which is configured to, before deleting the RB on the first cell, enable the first PDCP entity to receive a packet data convergence protocol service data unit (PDCP SDU) from a protocol layer above the PDCP entity or from a core network;
an allocation unit, which is configured to allocate a sequence number (SN) and a hyper frame number (HFN) for the PDCP SDU;
a transmission unit, which is configured to enable the first PDCP entity to transmit the PDCP SDU as well as the SN and the HFN allocated for the PDCP SDU to the second PDCP entity;
a first processing unit, which is configured to enable the first PDCP entity to process the PDCP SDU according to the SN and the HFN to generate a first packet data convergence protocol packet data unit (PDCP PDU), wherein the first processing unit is further configured to, in a case that the PDCP PDU needs to be processed by ciphering or integrity protection, perform the ciphering or the integrity protection on the PDCP PDU according to the SN and the HFN; and generate a packet header of the first PDCP PDU according to the SN;
wherein the first PDCP entity ciphers the PDCP PDU with an ciphering and deciphering security key of the first PDCP entity; and the first PDCP entity uses an integrity protection key of the first PDCP entity to perform the integrity protection on the PDCP PDU; and
wherein the second processing unit is further configured to, in a case that the PDCP PDU needs to be processed by ciphering or integrity protection, perform the ciphering or the integrity protection on the PDCP PDU according to the SN and the HFN; and generate a packet header of the second PDCP PDU according to the SN;

wherein the second PDCP entity ciphers the PDCP PDU with an ciphering and deciphering security key of the second PDCP entity; and the second PDCP entity uses an integrity protection key of the second PDCP entity to perform the integrity protection on the PDCP PDU; and a second processing unit, which is configured to enable the second PDCP entity to process the PDCP SDU according to the SN and the HFN transmitted by the first PDCP entity to generate a second PDCP PDU.

9. The data transmission apparatus of claim 8, wherein the establishment unit is further configured to establish the PDCP entity, a radio link control (RLC) entity and a logical channel on the second cell.

10. The data transmission apparatus of claim 8, further comprising:
a deletion unit, which is configured to delete the RB on the first cell; and
wherein the transmission unit is further configured to transmit each PDCP SDU not allocated with the SN in the first PDCP entity to the second PDCP entity.

11. A data transmission apparatus, comprising:
an establishment unit, which is configured to, after establishing a radio bearer (RB) on a first cell, establish an RB on a second cell, wherein a packet data convergence protocol (PDCP) entity of the RB on the first cell is a first PDCP entity of the RB, a PDCP entity of the RB on the second cell is a second PDCP entity of the RB;
a first processing unit, which is configured to enable the second PDCP entity to process a received PDCP PDU, transmit a second PDCP SDU obtained by processing the PDCP PDU and a sequence number (SN) corresponding to the second PDCP SDU to the first PDCP entity, wherein the first processing unit is further configured to acquire the SN from a packet header of the PDCP PDU; and in a case that the PDCP PDU needs to be processed by deciphering or integrity protection, perform the deciphering or the integrity protection on the PDCP PDU;
wherein the second PDCP entity deciphers the PDCP PDU with an ciphering and deciphering security key of the second PDCP entity; and the second PDCP entity uses an integrity protection key of the second PDCP entity to perform the integrity verification on the PDCP PDU; and wherein the second processing unit is further configured to acquire an SN from a packet header of the PDCP PDU; and in a case that the PDCP PDU needs to be processed by deciphering or integrity protection, perform the deciphering or the integrity protection on the PDCP PDU;
wherein the first PDCP entity deciphers the PDCP PDU with an ciphering and deciphering security key of the first PDCP entity; and the first PDCP entity uses an integrity protection key of the first PDCP entity to perform the integrity verification on the PDCP PDU;
a second processing unit, which is configured to enable the first PDCP entity to process a received PDCP PDU to obtain a first PDCP SDU; and
a transmission unit, which is configured to, before deleting the RB on the first cell, enable the first PDCP entity to deliver the first PDCP SDU and the second PDCP SDU to a protocol layer above the PDCP entity or to a core network.

12. The data transmission apparatus of claim 11, wherein the establishment unit is further configured to establish the PDCP entity, a radio link control (RLC) entity and a logical channel on the second cell.

13. The data transmission apparatus of claim 11, further comprising:
a detection and reordering unit, which is configured to enable the first PDCP entity to perform a duplicate packet detection and reordering on the second PDCP SDU transmitted by the second PDCP entity and the first PDCP SDU obtained by the processing of the first PDCP entity.

14. The data transmission apparatus of claim 11, further comprising:
a deletion unit, which is configured to delete the RB on the first cell; and
a transmission unit, which is configured to transmit each first PDCP SDU undelivered to the protocol layer above the PDCP entity or to the core network in the first PDCP entity and an SN corresponding to the each first PDCP SDU to the second PDCP entity, and transmit each second PDCP SDU undelivered to the protocol layer above the PDCP entity or to the core network in the first PDCP entity and an SN corresponding to the each second PDCP SDU to the second PDCP entity.

* * * * *